United States Patent
Okabe et al.

[11] Patent Number: 6,031,494
[45] Date of Patent: Feb. 29, 2000

[54] HANDY-PHONE WITH SHIELDED HIGH AND LOW FREQUENCY CIRCUITS AND PLANAR ANTENNA

[75] Inventors: Hiroshi Okabe, Kokubunji; Osamu Kamimura, Yokohama; Ken Takei, Hachioji; Yoshitaka Imakado, Hitachinaka, all of Japan

[73] Assignee: Hitachi, Ltd., Japan

[21] Appl. No.: 08/864,199

[22] Filed: May 28, 1997

[30] Foreign Application Priority Data

May 31, 1996 [JP] Japan .................................. 8-138023

[51] Int. Cl.$^7$ ................... H01Q 1/24; H04B 1/38
[52] U.S. Cl. .................... 343/702; 343/700 MS; 455/301; 455/575
[58] Field of Search .................. 343/700 MS, 702, 343/841, 767; 455/90, 300, 301, 575, 349, 351; 361/736, 816, 818; H01Q 1/24

[56] References Cited

U.S. PATENT DOCUMENTS 5,606,326  2/1997  Asai et al. .............................. 343/702
5,710,987  1/1998  Paulick ................................... 343/702

FOREIGN PATENT DOCUMENTS 6169207  6/1994  Japan .............................. H01Q 1/24

*Primary Examiner*—Michael C. Wimer
*Attorney, Agent, or Firm*—Sofer & Haroun, LLP

[57] ABSTRACT

An improved, compact, lightweight handy-phone provided with a built-in directional planar antenna is provided. The planar antenna is mounted on a portion of a high-frequency printed wiring board, and a shielding case covers the high-frequency printed wiring board with a surface of the portion exposed. A maximum linear size of the shielding case in the direction of main polarization of the planar antenna is nearly equal to half the wavelength of an electromagnetic wave to be radiated by the planar antenna.

12 Claims, 4 Drawing Sheets

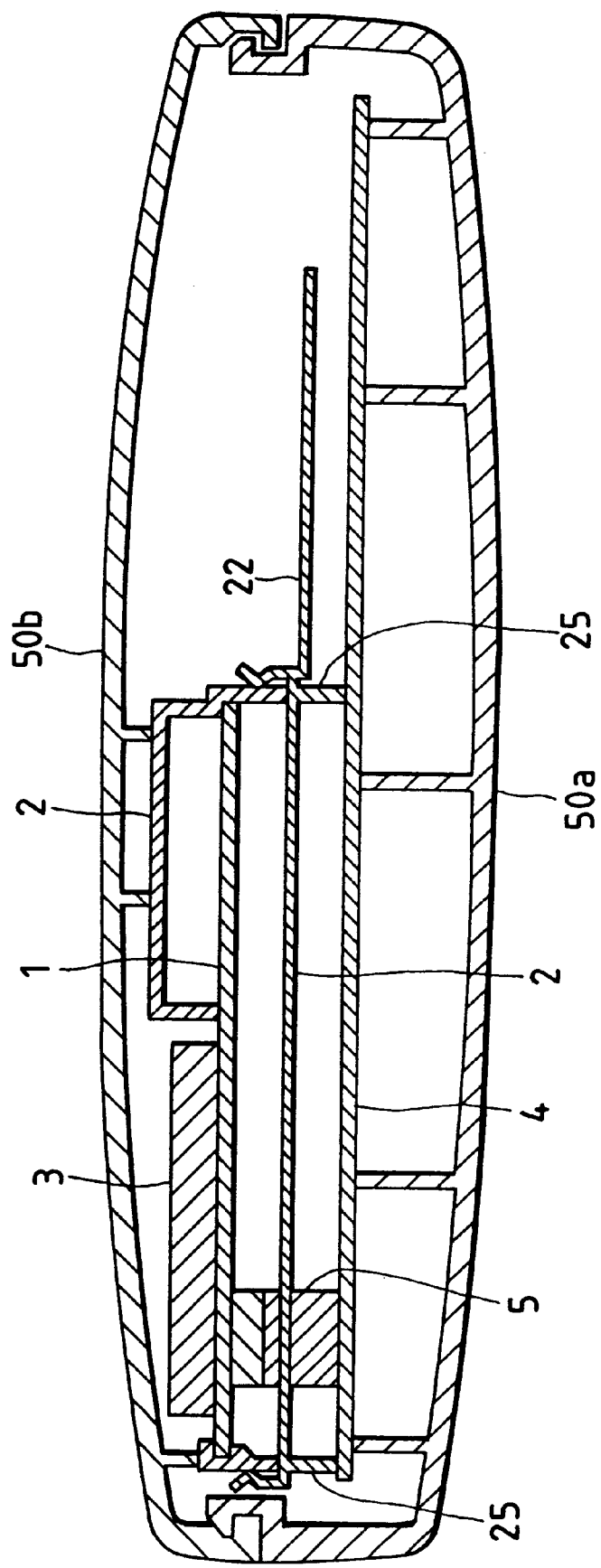

HANDY-PHONE WITH SHIELDED HIGH AND LOW FREQUENCY CIRCUITS AND PLANAR ANTENNA

BACKGROUND OF THE INVENTION

The present invention relates to a handy-phone suitable for use in a mobile radio communication network and, more specifically, to a handy-phone of a compact construction having a case containing a built-in antenna.

A handy-phone comprises, as principal components, a low-frequency circuit which handles base-band signals of a relatively low frequency representing information, such as sound signals and computer data, a high-frequency circuit which handles a high-frequency carrier signal for the radio transmission of information, and an antenna. Usually the antenna is a rod antenna which can be pulled out of the case for operation. However, it is troublesome to pull out the antenna from the case every time the handy-phone is used and it is desirable that the antenna of the handy-phone is of a built-in type.

A handy-phone with a built-in antenna as shown in FIG. 6 is proposed in Japanese Patent Laid-open (Kokai) No. Hei 6-169207. In this handy-phone, a low-frequency circuit and a high-frequency circuit are contained in a metal case (shielding case) 2, which will be referred to as "shielding case 2", and an inverted F type planar antenna 3 is mounted on the shielding case 2. The shielding case 2 holding the inverted F type planar antenna 3 is enclosed in a nonmetallic material (case 50).

The frequency bandwidth of the planar antenna 3 is expanded by properly shaping the shielding case 2. If a directional antenna is employed, the directivity of the antenna may possibly be disturbed by a current induced in the shielding case 2. Since the inverted F type planar antenna 3 is non-directional, nothing is mentioned about the disturbance of directivity in the specification of the above mentioned Patent. A slot antenna formed by forming a slot for radiating an electromagnetic wave in the upper wall of a flat conductive box and a micro-strip antenna provided with micro-strip lines are the well-known directional planar antennas. These antennas are advantageous in that the sensitivity with respect to the direction of directivity can be enhanced and the radiation of an electromagnetic wave toward the user's body can be reduced.

The antenna 3 mounted on the shielding case 2 having construction as shown in FIG. 6 increases the thickness of the handy-phone. Since the antenna 3 is disposed necessarily close to the circuit when the built-in antenna 3 is thus mounted on the shielding case 2, the electromagnetic interference of the antenna 3 with the circuit increases. Therefore, the low-frequency circuit is covered with the shielding case 2 as well as the high-frequency circuit, which increases the volume and the weight of the handy-phone.

In conventional handy-phones employing a pull rod antenna, the shielding case for the low-frequency circuit is often omitted. FIG. 7 shows another example of conventional handy-phone. A high-frequency printed wiring board 1 mounted with high-frequency circuit elements is covered with a shielding case 2, and high-frequency power is supplied from the high-frequency printed wiring board 1 through a cable 6 to an antenna 3 disposed outside the shielding case 2. The high-frequency printed wiring board 1 is electrically connected to a low-frequency printed wiring board 4 mounted with low-frequency circuit elements by a connector 5. The shielding case 2 containing the high-frequency printed wiring board 1 is joined to the low-frequency printed wiring board 4 by snapping fingers 7 into recesses formed in the low-frequency printed wiring board 4 and is fastened to the low-frequency printed wiring board 4 with screws 8.

However, in such construction, when the shielding case 2 is thus fastened to the low-frequency printed wiring board 4, a mechanical stress is induced in the connector 5 and there is the possibility that the connector 5 is unable to connect the circuits satisfactorily or soldered parts are broken by the stress.

SUMMARY OF THE INVENTION

Accordingly, it is an object of the present invention to solve the foregoing problems in the prior art and to provide an improved, small, lightweight handy-phone capable of being provided with a built-in directional planar antenna.

The foregoing problems can effectively be solved by a directional planar antenna mounted on a portion of a high-frequency printed wiring board, and a shielding case covering the high-frequency printed wiring board with a surface of the portion exposed and having a maximum straight length in the direction of main polarization of the planar antenna which is nearly half the wavelength of an electromagnetic wave to be radiated by the planar antenna. The reduction of the directional gain of the planar antenna can be suppressed, increase in the thickness of the handy-phone by the planar antenna can be prevented and the electromagnetic shielding of the low-frequency printed wiring board can be omitted by using such a construction. Since the directional gain of the planar antenna can be maintained, the directional planar antenna can be built in the handy-phone.

A current is induced in the surface of the shielding case when an electromagnetic wave radiated by the planar antenna reach the surface of the shielding case. In the case where the shielding case is provided with a main portion and an extension so as to form the maximum straight length, the induced current flows through the conductive shielding case to the extension. Since the length of a passage of the induced current on the main portion and the extension of the conductive shielding case is about half the wavelength of the electromagnetic wave radiated by the planar antenna, the induced current reached the extension resonates on the half-wavelength passage. Consequently, a current distribution on the half-wavelength conductive surface does not include any partial current distribution of an opposite phase. The induced current cause the half-wavelength conductive surface to radiate an electromagnetic wave. However, the direction pattern of the electromagnetic wave radiated from the half-wavelength conductive surface does not have any null point because there is no current distribution of an opposite phase, and hence the direction pattern is not disturbed.

Although the electromagnetic wave produced by the induced current affects the directivity of the antenna, the directivity of the antenna is not disturbed because the direction in which the shielding case is extended is the same as the direction of main polarization, i.e., the direction of an electric field, the direction of the electric field coincides with the direction of the induced current and the directivity pattern of the radiated electromagnetic wave is not disturbed, and hence the reduction of the directional gain can be suppressed. The directional gain of the antenna is expressed by the intensity of an electromagnetic wave with respect to the center axis of the antenna perpendicular to the surface of the antenna. Generally, it is desirable that the intensity of the electromagnetic wave radiated by the antenna should be the greatest in the direction of the center axis. If the directivity is disturbed, the direction in which the intensity of the electromagnetic wave is the greatest deviates from the center axis and, consequently, the directional gain of the antenna is reduced.

Incidentally, an electromagnetic wave radiated by the planar antenna induce a current in the conductive portion of the low-frequency printed wiring board. If the length of the planar conductive portion is greater than half the wavelength of the high-frequency current, a large current is induced in the planar conductive portion owing to the unique characteristic of high-frequency currents because a high-frequency current is a wave phenomenon, and a pair of knots are necessary to maintain the wave phenomenon. A pair of knots are not formed in the wave and a small current is induced if the length of the conductive surface is less than half the wavelength.

However, when the foregoing shielding case is used, the induced current resonates in the shielding case, whereby the current induced in the low-frequency printed wiring board is reduced greatly, which can be explained to be due to the absorption of most part of the induced current by resonance on the shielding case. Further explanation is as follows. Since the antenna is mounted on the portion of the high-frequency printed wiring board, the shielding case covering the high-frequency printed wiring board is necessarily closer to the antenna than the low-frequency printed wiring board. Suppose that a passage extending between the antenna and the conductive portion of the low-frequency printed wiring board is a circuit along which the current flows. Then, the shielding case serves as a resonance circuit inserted in the passage, and the current flowing to the conductive portion of the low-frequency printed wiring board is short-circuited and intercepted by the resonance circuit. Since the current induced in the low-frequency printed wiring board is reduced greatly, the low-frequency printed wiring board need not be shielded by any electromagnetic shield, so that increase in the volume and the weight of the handy-phone is avoided.

An opposite phase component is produced and the directional gain of the antenna is reduced if the maximum straight length formed by the total length of the main portion and the extension is longer than half the wavelength, and the current induced in the low-frequency printed wiring board increases adversely because any resonance occurs if the same length is shorter than half the wavelength. Measurement showed that a desirable maximum straight length in view of directional gain is in the range of wavelength/2±wavelength/20.

The shielding case is provided with a window through which the surface of the portion of the printed wiring board on which the planar antenna is mounted is exposed. Any one of general antennas including non-directional antennas, as well as the directional antenna, can be mounted through the window on the printed wiring board to avoid increase in the thickness of the handy-phone.

These and other objects and many of the attendant advantages of the invention will be readily appreciated as the same becomes better understood by reference to the following detailed description when considered in connection with the accompanying drawings. Incidentally, in FIG. 1 and FIGS. 3 to 7, the same reference numerals indicate the same elements or the similar elements.

BRIEF DESCRIPTION OF THE DRAWINGS

FIG. 5 is a sectional view of a handy-phone in a fourth embodiment according to the present invention;

DETAILED DESCRIPTION OF THE PREFERRED EMBODIMENTS

Figure 1:
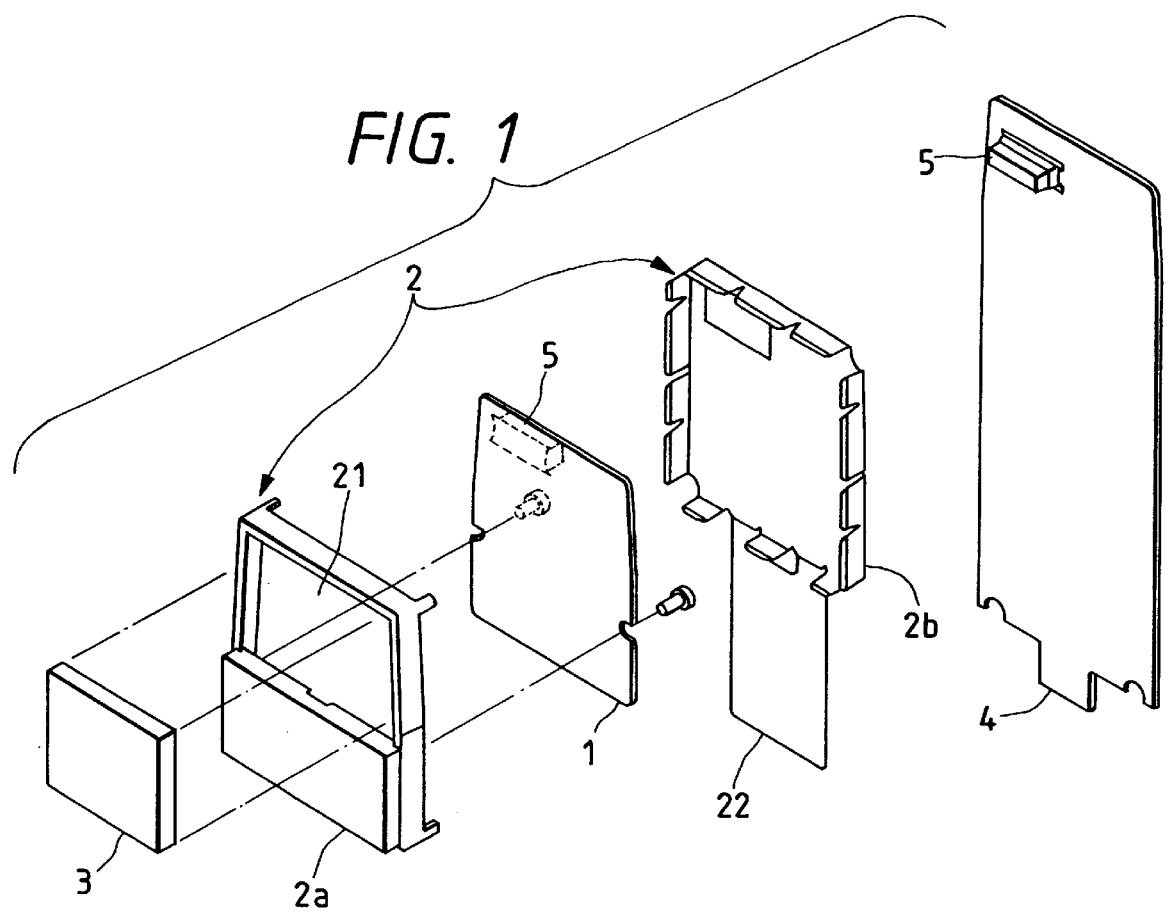
FIG. 1 is an exploded perspective view of a handy-phone in a first embodiment according to the present invention.

Handy-phones in preferred embodiments according to the present invention will be described hereinafter with reference to the accompanying drawings, in which like or corresponding parts are designated by the same reference character.
First Embodiment Referring to FIG. 1 showing a handy-phone in a first embodiment according to the present invention, there are shown a high-frequency printed wiring board 1, and a shielding case 2 having a front main portion 2a covering the front surface of the high-frequency printed wiring board 1 and provided with a window 21, a back main portion 2b covering the back surface of the high-frequency printed wiring board 1, and an extension 22 is extended portion of the shielding case 2. The maximum straight length formed by the total length of the back main portion 2b and the extension 22 of the shielding case 2 is equal to half the wavelength of an electromagnetic wave to be radiated by a planar antenna.

The planar antenna 3 is mounted on a portion of the high-frequency printed wiring board 1 a surface of which is exposed in the window 21. The radiation of an electromagnetic wave into free space by the planar antenna 3 is not interfered with at all even if the planar antenna 3 is contained in a case 50 (not shown in FIG. 1). Since high-frequency circuit elements (not shown in FIG. 1) mounted on the high-frequency printed wiring board 1 are covered with the main portions 2a and 2b excluding a portion thereof corresponding to the window 21, the electromagnetic interference of the electromagnetic wave radiated by the planar antenna through the free space with a high-frequency circuit can be suppressed.

A low-frequency printed wiring board 4 is disposed on the outer side of the back main portion 2b and the extension 22 opposite to and substantially in parallel to the surface of the high-frequency printed wiring board 1 opposite the surface on which the planar antenna 3 is attached.

The electromagnetic wave radiated by the planar antenna 3 reaches the surface of the back main portion 2b of the shielding case 2 and induce a current in the surface of the back main portion 2b. The induced current flows through a conductive portion of the back main portion 2b to the extension 22 of the shielding case 2. Since the size of a current passage on a conducive surface consisting of the surfaces of the back main portion 2b and the extension 22 corresponds to the maximum straight length and is equal to half the wavelength of the electromagnetic wave to be radiated by the planar antenna 3, the electromagnetic wave resonates in the half-wavelength passage for the induced current. Consequently, the flow of the induced current into the low-frequency printed wiring board 4 is suppressed and the induced current is concentrated on the half-wavelength conductive surface. Since a current distribution on the half-wavelength surface does not include any local current distribution of an opposite phase, a directivity pattern of the radiated electromagnetic wave formed by the current distribution does not have any null point and the direction pattern is not disturbed. Therefore, the reduction of the directional gain does not occur.

Figure 2:
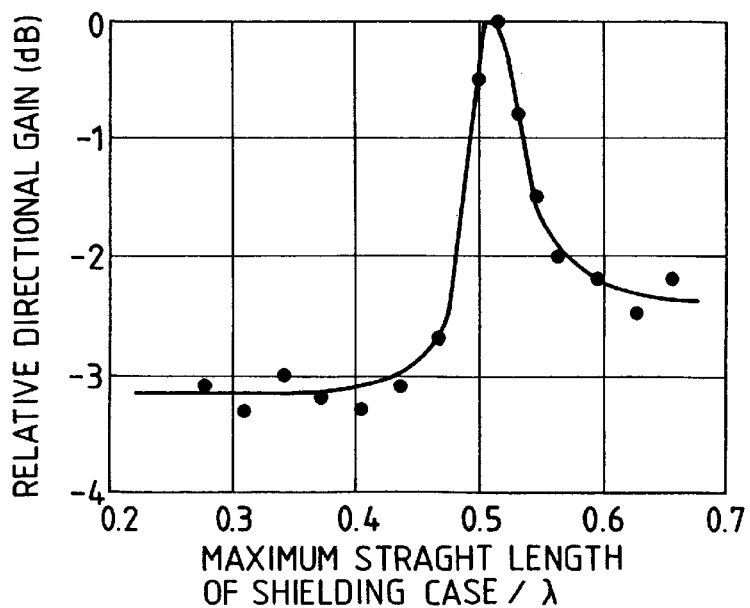
FIG. 2 is a graph showing measured directional gain.

FIG. 2 is a graph showing measured results of the dependence of the directional gain on the maximum straight length of the shielding case 2, i.e., the total length of the back main portion 2b and the extension 22. A normalized maximum straight length of the shielding case normalized by wavelength (shown by λ in the FIG. 2) is measured on the horizontal axis, and relative directional gain is measured on the vertical axis. The directional gain is a maximum when the maximum straight length is half the wavelength. The directional gain is relatively large when the maximum straight length of the shielding case is in the range of wavelength/2±wavelength/20. Therefore, a desirable maximum straight length may be in that range.

Even if the extension 22 is provided with a plurality of holes of a diameter far smaller than the wavelength of an electromagnetic wave to be radiated by the planar antenna 3 (i.e., preferably, a diameter equal to 1/10 of the wavelength or below, more preferably 1/20 of the wavelength or below), a passage of the high-frequency current of a wavelength far greater than the diameter of the holes on the extension 22 is the same as the passage of the same when the extension 22 is not provided with any holes. Therefore, the shielding case 2 can be formed in a lightweight construction by forming those holes in the extension 22 without entailing the interference of the current induced in the conductive surface of the back main portion 2b and the extension 2 of the shielding case 2 with the passage of a length nearly equal to half the wavelength of the electromagnetic wave radiated by the planar antenna 3. The extension 22 may be a wire netting formed by interlacing fine wires, since meshes in the wire netting corresponds to the foregoing holes in the extension 22.

The shielding case 2 can be constructed and the antenna 3 can be mounted on the high-frequency printed wiring board 1 by a case assembling method and a circuit element mounting method employed in fabricating a conventional handy-phone. Therefore, the use of the constitution according to the present invention will not increase the manufacturing costs. Thus, the planar antenna 3 can be built in the handy-phone without entailing increase in the manufacturing costs and increase in electromagnetic interference between the high-frequency circuit and the low-frequency circuit and without reducing the directional gain.

Second Embodiment

Figure 3:
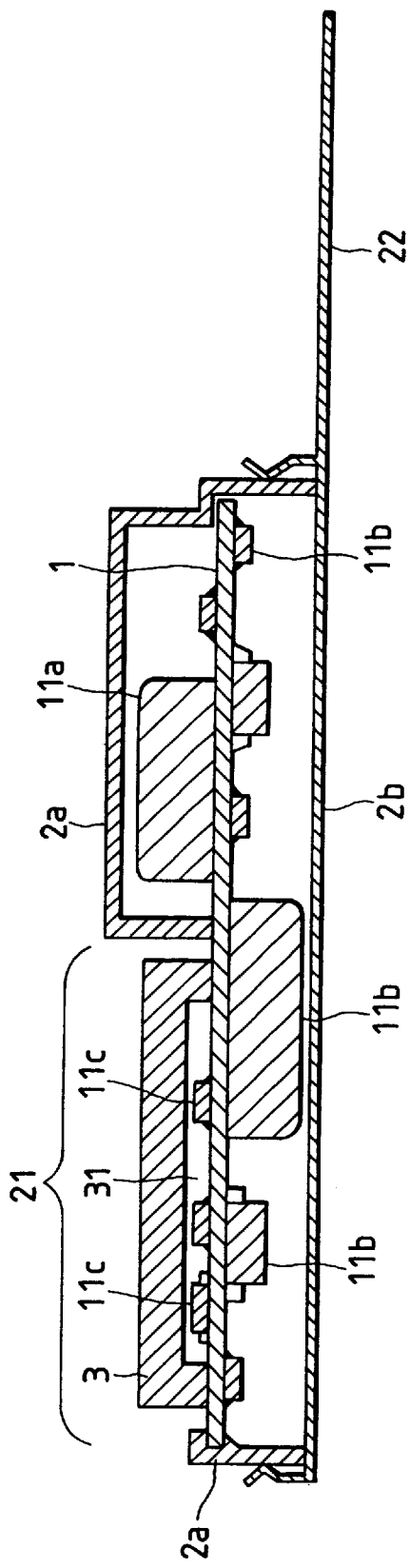
FIG. 3 is a sectional view of a handy-phone in a second embodiment according to the present invention.

Referring to FIG. 3 showing a handy-phone in a second embodiment according to the present invention, a portion of a front main portion 2a of a shielding case 2 around a window 21 is bent toward a high-frequency printed wiring board 1 so as to surround the contact surfaces of a planar antenna 3 and the high-frequency printed wiring board 1 and to be in contact with the high-frequency printed wiring board 1. Thus, electromagnetic interference through a space around the periphery of the window 21 between the planar antenna 3 mounted on the front surface of the high-frequency printed wiring board 1 and high-frequency circuit elements 11a mounted on the front surface of the high-frequency printed wiring board 1 on which the planar antenna 3 is mounted can be suppressed. Electromagnetic interference through a gap along the side surfaces of the high-frequency printed wiring board 1 between the planar antenna 3 and high-frequency circuit elements 11b mounted on the back surface of the high-frequency printed wiring board 1 opposite the front surface on which the planar antenna 3 is mounted can be suppressed by providing the high-frequency printed wiring board 1 with an internal conductive layer to be kept at a ground potential.

The portion of the front main portion 2a around the window 21 is kept in contact with a grounding conductor placed on the front surface of the high-frequency printed wiring board 1 to enhance electromagnetic interference suppressing effect. For some arrangement of the high-frequency circuit elements 11a and 11b and wiring lines in a space surrounded by main portions 2a and 2b, the distribution of a current induced in the shielding case 2 could be controlled and electromagnetic interference suppressing effect could be enhanced by electrically isolating the portion of the front main portion 2a around the window 21 from the grounding conductor instead of placing the same in contact with the grounding conductor.

A planar antenna 3 employed in the second embodiment is a flat conductive box serving as a slot antenna, and provided on its back surface with a recess 31. Since the flat conductive box is kept at a ground potential, wiring lines and high-frequency circuit elements 11c may be contained in a space defined by the recess 31, which increases packaging density. The high-frequency circuit elements 11c contained in the space defined by the recess 31 is surrounded by the grounding conductive surface of the planar antenna 3 and an internal grounding conductive layer formed in the high-frequency printed wiring board 1, so that the electromagnetic interference of an electromagnetic wave radiated by the planar antenna 3 with the high-frequency circuit elements 11c can be avoided.

Third Embodiment

Figure 4:
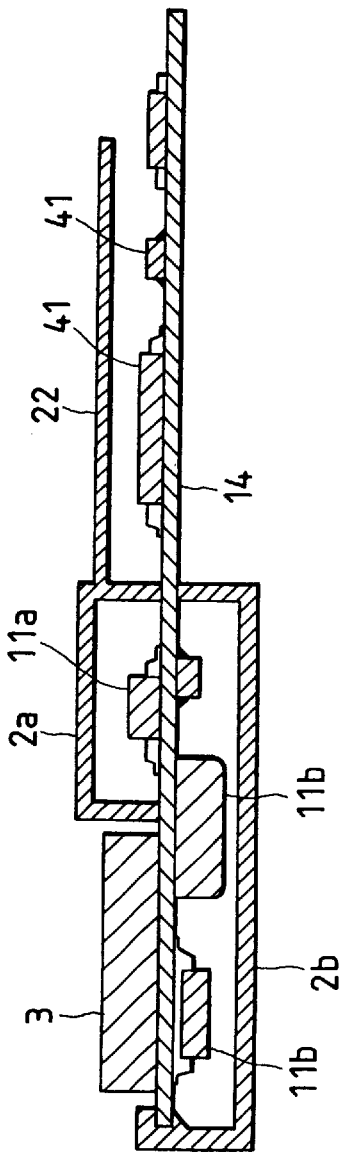
FIG. 4 is a sectional view of a handy-phone in a third embodiment according to the present invention.
Figure 7:
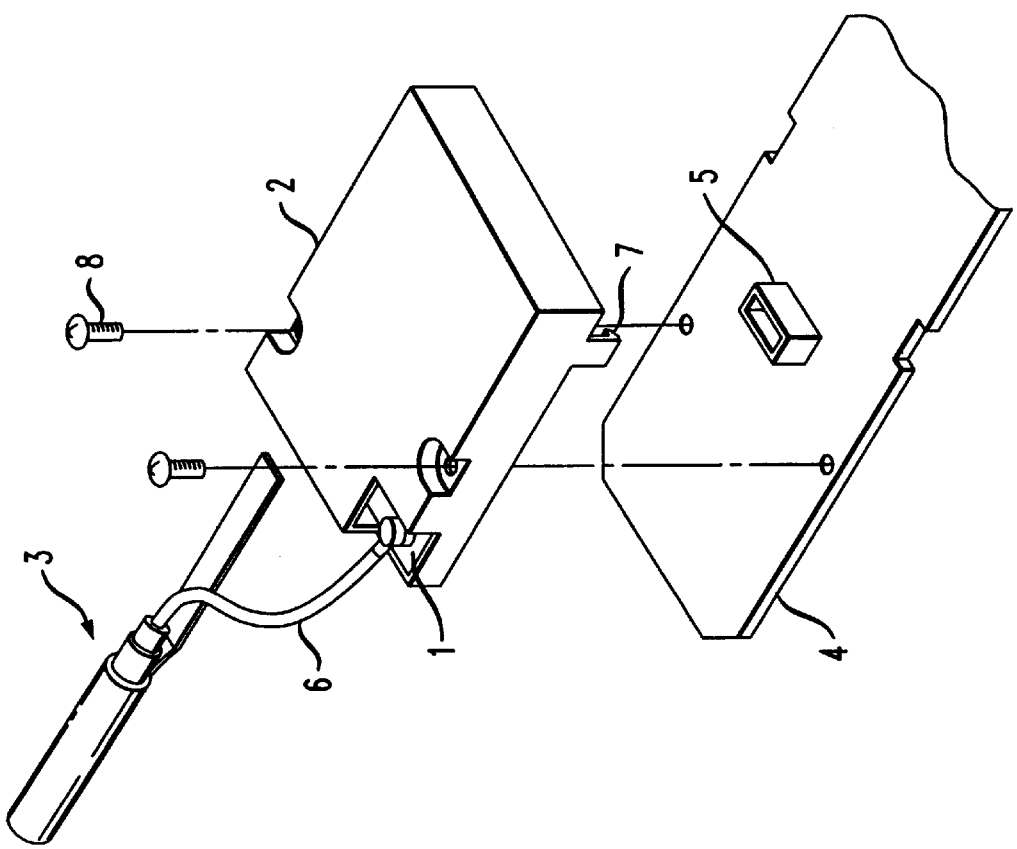
FIG. 7 is a perspective view of another conventional handy-phone.
Figure 6:
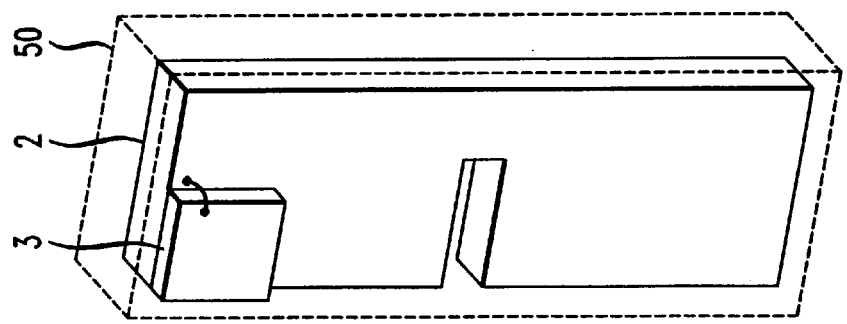
FIG. 6 is a perspective view of a conventional handy-phone.

A handy-phone in a third embodiment according to the present invention will be described with reference to FIG. 4. The handy-phone in this embodiment employs a high-frequency printed wiring board 1 having an extension, and low-frequency circuit elements 41 are mounted on the surface of the extension of the high-frequency printed wiring board 1. Thus, both a high-frequency circuit and a low-frequency circuit are formed on a single printed wiring board. In FIG. 4, indicated at 14 is a common high-and-low-frequency printed wiring board. A shielding case 2 covers only high-frequency circuit elements 11a and 11b. In this embodiment, a main portion 2a is extended to form an extension 22 disposed in front of the low-frequency circuit. The total length of the main portion 2a and the extension 22 is the maximum straight length. When the main portion 2a is kept in contact with a grounding conductor of the high-frequency circuit, the total length of the main portion 2a, the extension 22 and the portion of the grounding conductor which is not covered by the main portion 2a and is exposed is the maximum straight length.

Since the single printed wiring board is used for supporting both the high-frequency circuit and the low-frequency circuit, the case of the handy-phone can be formed in a relatively small thickness.

Fourth Embodiment

Referring to FIG. 5 showing a handy-phone in a fourth embodiment according to the present invention, a high-frequency printed wiring board 1 is connected by a connector 5 to a low-frequency printed wiring board 4 disposed opposite to the high-frequency printed wiring board 1. The high-frequency printed wiring board 1 and the low-frequency printed wiring board 4 are spaced a predetermined distance apart from each other by legs 25 formed on a shielding case 2. The low-frequency printed wiring board 4 is fixed to a first case 50a, and the shielding case 2 is sandwiched between a second case 50b and the low-frequency printed wiring board 4 so as to be restrained from movement in directions perpendicular to the low-frequency printed wiring board 4.

The shielding case 2 is not provided with any positioning and fastening structure, such as screws, snap-in fingers or solder joints, for positioning the shielding case 2 with respect to directions parallel to the surfaces of the printed wiring boards. Therefore, any mechanical stress, which is often induced in the conventional connector, is not induced in the connector 5, and hence problems including faulty connection can be avoided. Consequently, the handy-phone has improved reliability, and increase in parts costs and manufacturing processes necessary for fastening the shielding case 2 by screws, snap-in fingers or solder joints can be avoided.

As is apparent from the foregoing description, according to the present invention, the directional planar antenna can be built in the handy-phone without reducing the directional gain of the directional planar antenna. Since the planar antenna can be mounted on the high-frequency printed wiring board and the shielding case for preventing electromagnetic interference may be used to cover only the high-frequency circuit, the handy-phone can be formed in a compact, lightweight construction. Since the ordinary mounting techniques can be applied to the manufacture of the handy-phone, increase in the manufacturing costs can be avoided. Since the handy-phone is assembled by an assembling method which does not induce any mechanical stress in the connector, the handy-phone has improved reliability.

It is further understood by those skilled in the art that the foregoing description is a preferred embodiments of the disclosed device and that various changes and modifications may be made in the invention without departing from the spirit and scope thereof.

What is claimed is:

1. A handy-phone comprising:
    a low-frequency printed wiring board on which low-frequency circuit elements are mounted,
    a high-frequency printed wiring board on which high-frequency circuit elements are mounted,
    a case containing at least the low-frequency printed wiring board and the high-frequency printed wiring board,
    a directional planar antenna radiating an electromagnetic wave, and
    a shielding case for shielding electromagnetically the high-frequency circuit elements;
    wherein said planar antenna is mounted on a portion of the high-frequency printed wiring board,
    wherein said shielding case covers the high-frequency printed wiring board with a surface of the portion exposed, and
    wherein said shielding case has a maximum straight length in the direction of main polarization of the planar antenna which is in a range of half of a wavelength of the electromagnetic wave plus $1/20$ of the wavelength and half the wavelength minus $1/20$ of the wavelength.

2. A handy-phone according to claim 1, wherein said shielding case has a main portion enclosing the high-frequency circuit elements and an extension extending in the direction of main polarization of the planar antenna, and said main portion and said extension have a total length forming the maximum straight length of the shielding case.

3. A handy-phone according to claim 2, wherein said extension is provided with a plurality of holes of a diameter less than $1/10$ of the wavelength of an electromagnetic wave to be radiated by the planar antenna.

4. A handy-phone according to claim 1, wherein said low-frequency printed wiring board is spaced a predetermined distance apart from a surface of the high-frequency printed wiring board opposite the surface of the same on which the planar antenna is mounted, and said shielding case is interposed between the high-frequency printed wiring board and the low-frequency printed wiring board.

5. A handy-phone according to claim 1, wherein the high-frequency printed wiring board and the low-frequency printed wiring board are portions of a single common printed wiring board.

6. A handy-phone according to claim 1, wherein said shielding case is provided with a window for exposing a surface of the portion on which the planar antenna is mounted, and near the window a contact portion of the shielding case with the high-frequency printed wiring board is formed so as to surround a contact surface of the planar antenna with the high-frequency printed wiring board.

7. A handy-phone according to claim 1, wherein the planar antenna is provided with a recess in a central portion of a surface thereof facing the high-frequency printed wiring board, and some of the high frequency circuit elements are mounted on a portion of the high-frequency printed wiring board corresponding to the recess.

8. A handy-phone comprising:
    a low-frequency printed wiring board on which low-frequency circuit elements are mounted,
    a high-frequency printed wiring board on which high-frequency circuit elements are mounted,
    a case containing at least the low-frequency printed wiring board and the high-frequency printed wiring board,
    a planar antenna, and
    a shielding case covering the high-frequency printed wiring board for shielding electromagnetically the high-frequency circuit elements;
    wherein said planar antenna is mounted on a portion of the high-frequency printed wiring board a surface of which is exposed in the window, and
    wherein near the window a contact portion of the shielding case with the high-frequency printed wiring board is formed so as to surround a contact surface of the planar antenna with the high-frequency printed wiring board.

9. A handy-phone according to claim 8, wherein the high-frequency printed wiring board has an internal conductive layer to be kept at a ground potential.

10. A handy-phone according to claim 8, wherein the planar antenna is a slot antenna composed of a flat conductive box.

11. A handy-phone according to claim 10, wherein the planar antenna is provided with a recess in a central portion of a surface thereof facing the high-frequency printed wiring board, some of the high-frequency circuit elements are mounted on a portion of the high-frequency printed wiring board corresponding to the recess.

12. A handy-phone comprising:
    a low-frequency printed wiring board on which low-frequency circuit elements are mounted,
    a high-frequency printed wiring board on which high-frequency circuit elements are mounted,
    a case containing at least the low-frequency printed wiring board and the high-frequency printed wiring board, and a shielding case covering the high-frequency printed wiring board for shielding electromagnetically the high-frequency circuit elements;

wherein said low-frequency printed wiring board and said high-frequency printed wiring board are disposed opposite to each other and are physically and electrically connected by a connector, wherein said shielding case is provided with legs for spacing the shielding case a predetermined distance apart from the low-frequency printed wiring board, and wherein said shielding case, said connector and said low-frequency printed wiring board are sandwiched integrally between a portion of the case near the shielding case and another portion of the same near the low-frequency printed wiring board.

* * * * *